Figure 1:
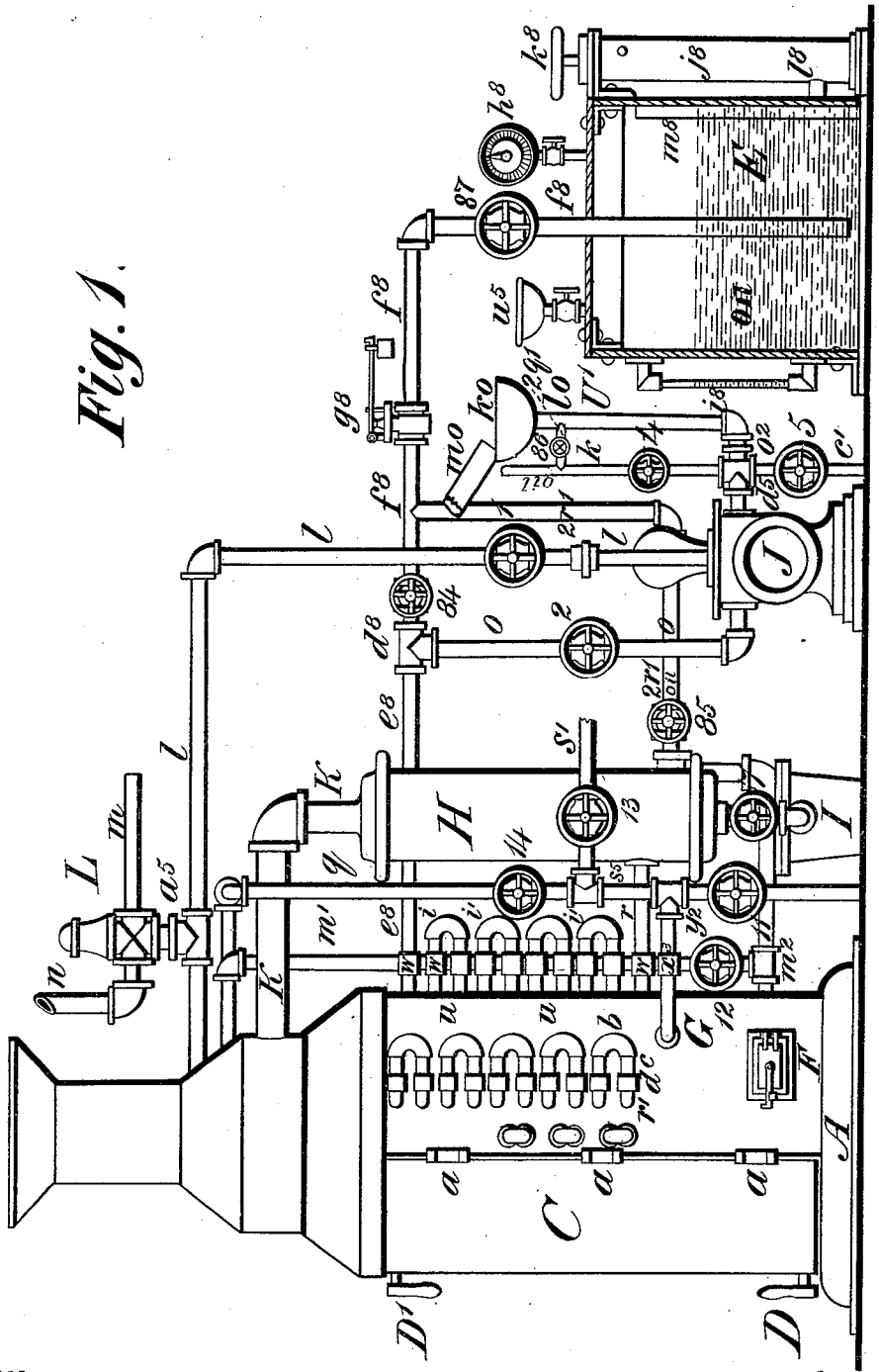

(No Model.) 7 Sheets—Sheet 1.

W. F. BROWNE.
PROCESS OF AND APPARATUS FOR GENERATING HIGH PRESSURE GAS.

No. 263,307. Patented Aug. 29, 1882.

Witnesses.
R. Sylvani.
E. H. Legrand

Inventor.
Wm Frank Browne (No Model.) 7 Sheets—Sheet 6.

W. F. BROWNE.

PROCESS OF AND APPARATUS FOR GENERATING HIGH PRESSURE GAS.

No. 263,307. Patented Aug. 29, 1882.

WITNESSES. INVENTOR.
R. Sylvani. Wm Frank Browne
E. N. Legrand

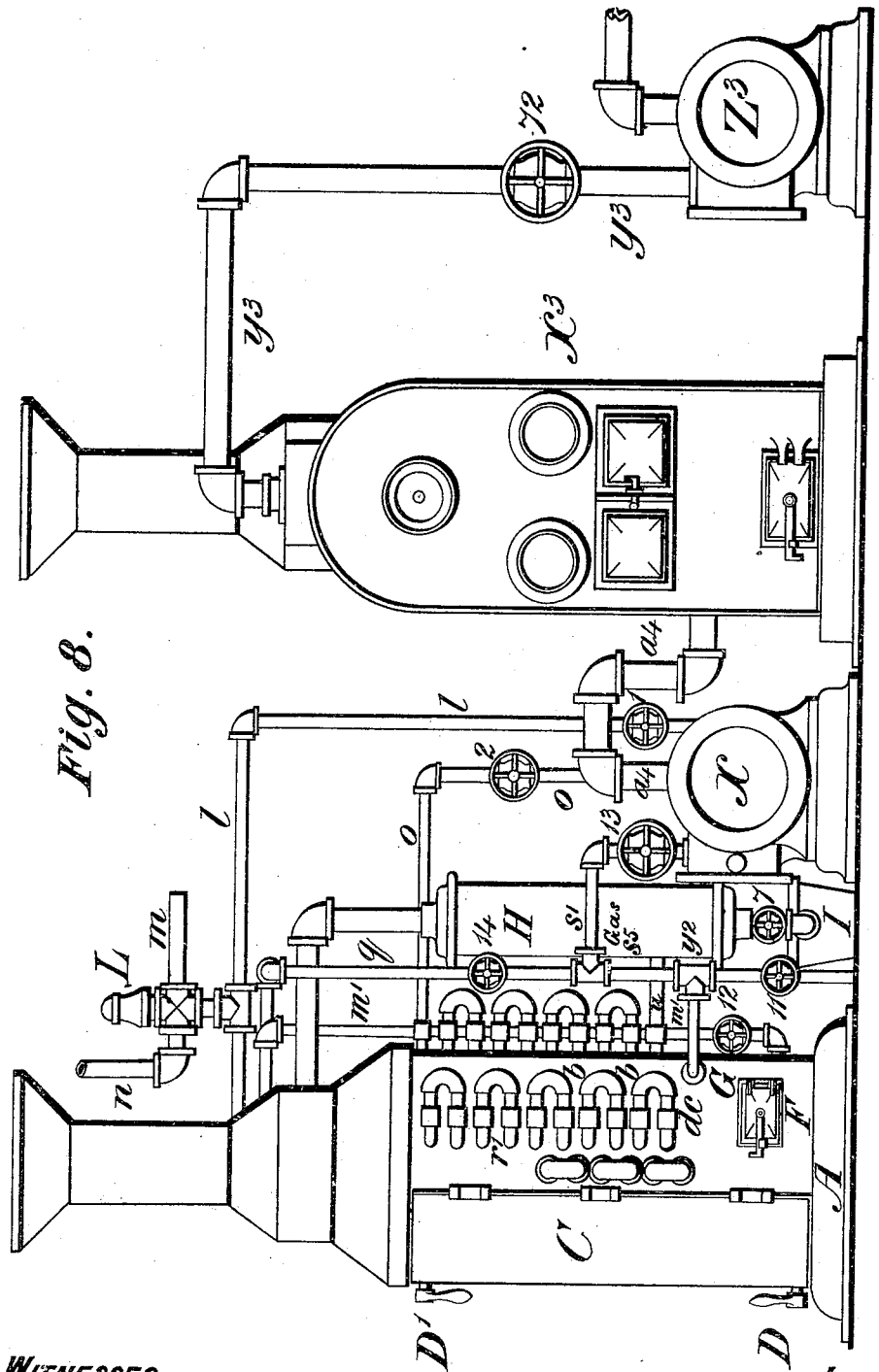

UNITED STATES PATENT OFFICE.

WILLIAM FRANK BROWNE, OF NEW YORK, N. Y.

PROCESS OF AND APPARATUS FOR GENERATING HIGH-PRESSURE GAS.

SPECIFICATION forming part of Letters Patent No. 263,307, dated August 29, 1882.

Application filed October 21, 1881. (No model.)

*To all whom it may concern:*

Be it known that I, WM. FRANK BROWNE, of the city, county, and State of New York, have invented certain new and useful Improvements in the Process of and Apparatus for Generating High-Pressure Gas or Gaseous Vapors, &c.; and I do hereby declare that the following is a clear and full description thereof, reference being had to the accompanying drawings, which form a part of this specification.

This invention relates to the method of and to means for generating high-pressure gas or gaseous vapors for motive power, heating and illuminating purposes, and for carbureting gaseous vapors and fixing the same by passing them through suitable superheaters, retorts, or other suitable heating devices wherein a fixed gas can be formed, and also in improved methods for storing gas for subsequent use.

The invention consists, first, in the process of generating gas which consists in forcing powdered carbonaceous material and water together into and through heated conduits; second, in the process of generating gas which consists in forcing together powdered fuel, carbonaceous material, liquid hydrocarbon, and water into and through heated conduits; third, in the process of generating gas which consists in forcing steam or gaseous vapor under pressure through a hydrocarbon liquid, then mixing the carbureted steam or vapor with the products of combustion from a furnace, and then forcing the resulting mixture into and through generating and fixing conduits; fourth, in the combination of the generating apparatus, a connected pump, a water-pipe, a pipe for carbonaceous material, and an oil-supply pipe; fifth, in the oil-supply pipe and the pipe for supplying powdered carbonaceous material connected with each other, in combination with the pump, the generating-coils, and suitable connections, for the purpose hereinafter described; sixth, in the carburetor and a steam-pipe opening therein, a pipe connected with the stack for conveying products of combustion, and connected with the carburetor by an injecting device, in combination with the fixing-coils of the generator; seventh, in a fixed submerged high-pressure-gas holder provided with a body of water in its lower portion, connected by a suitable pipe with an equalizing body of water above it, for keeping the gas under pressure and forcing it into the mains, and said holder having induction and eduction gas-pipes, for the purpose described; and it finally consists in a fixed submerged high-pressure holder connected with a suitable water-supply above it, in combination with a high-pressure-gas generator and an equalizing and regulating valve.

Figure 2:
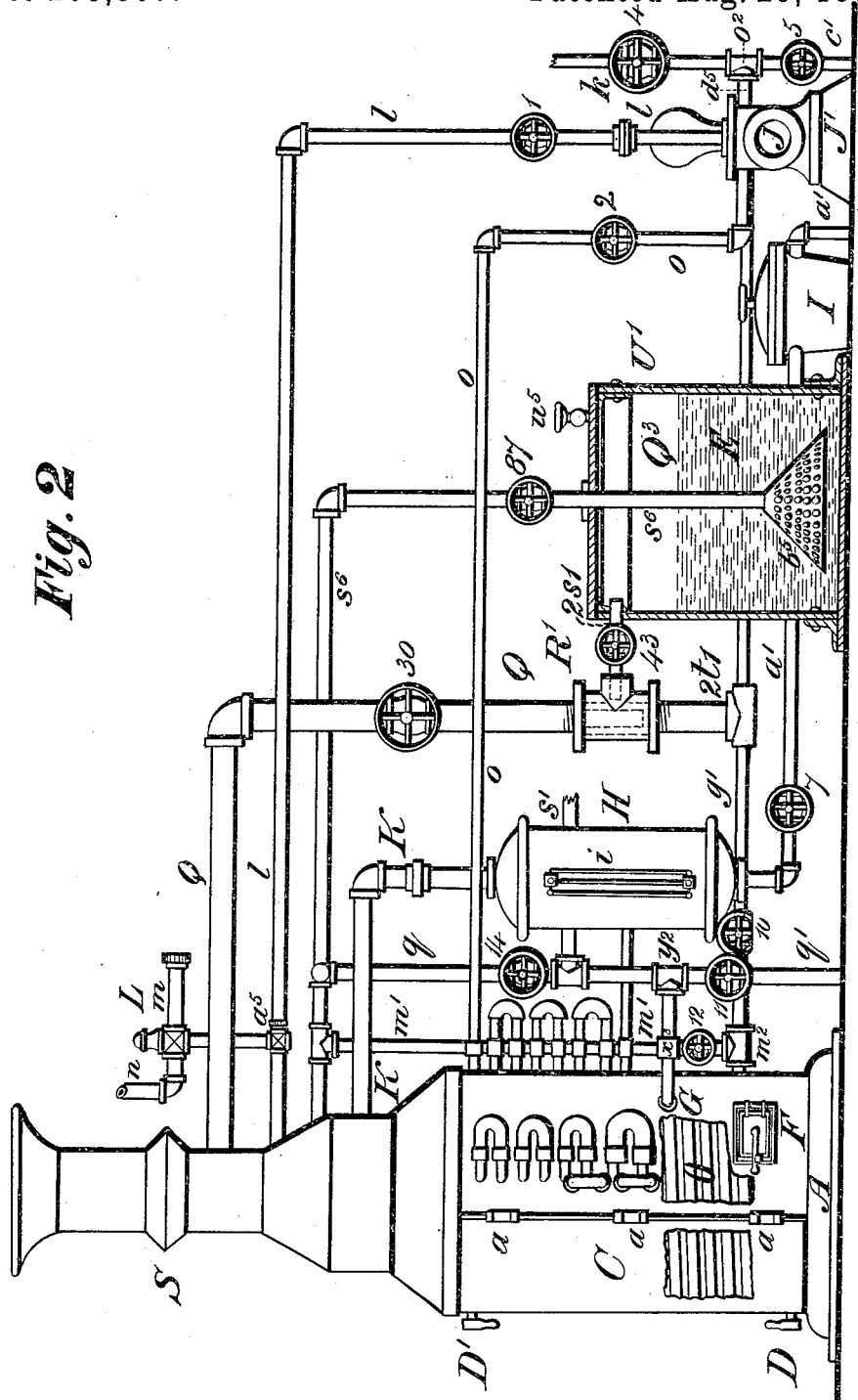
Figure 3:
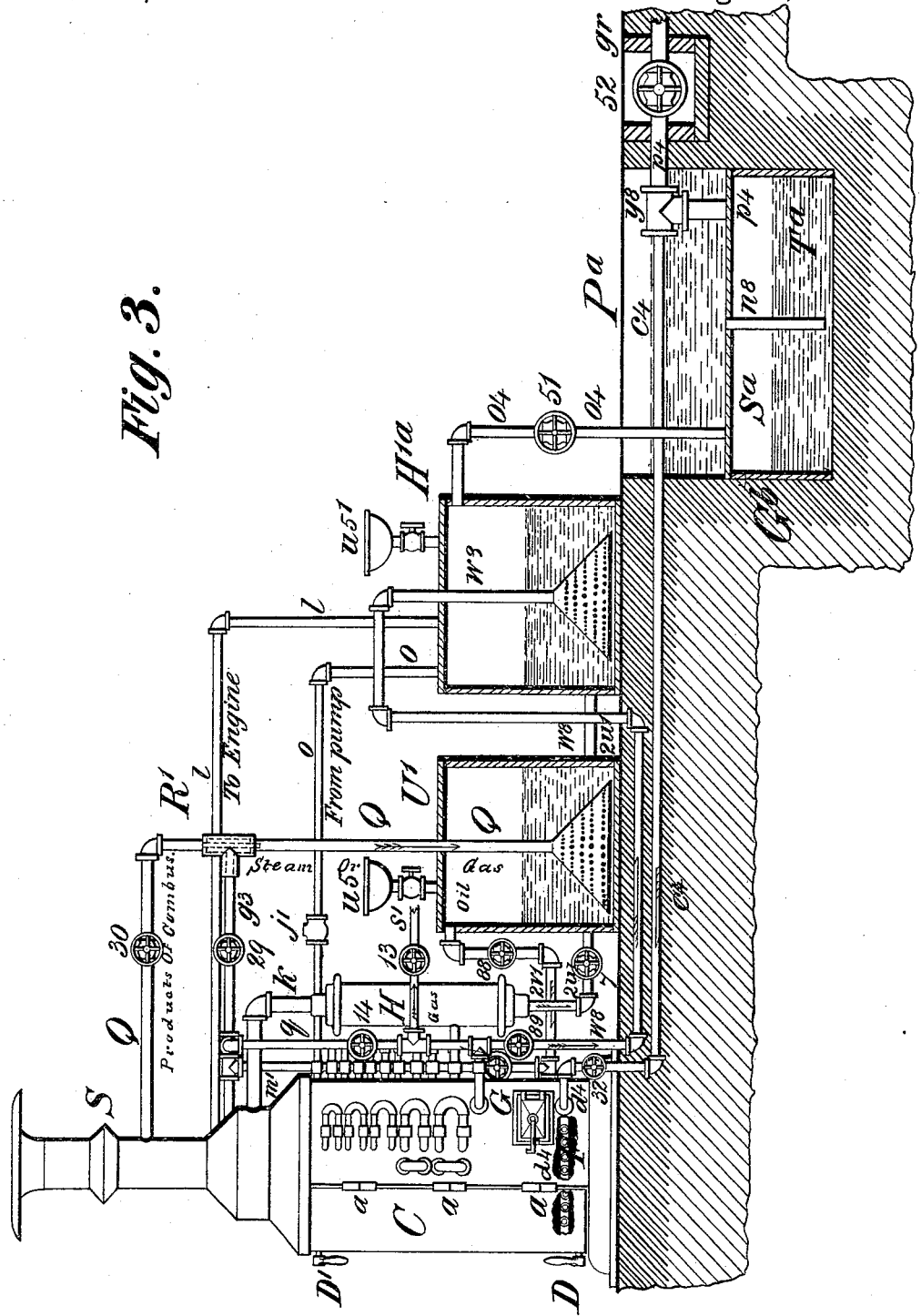
Figure 4:
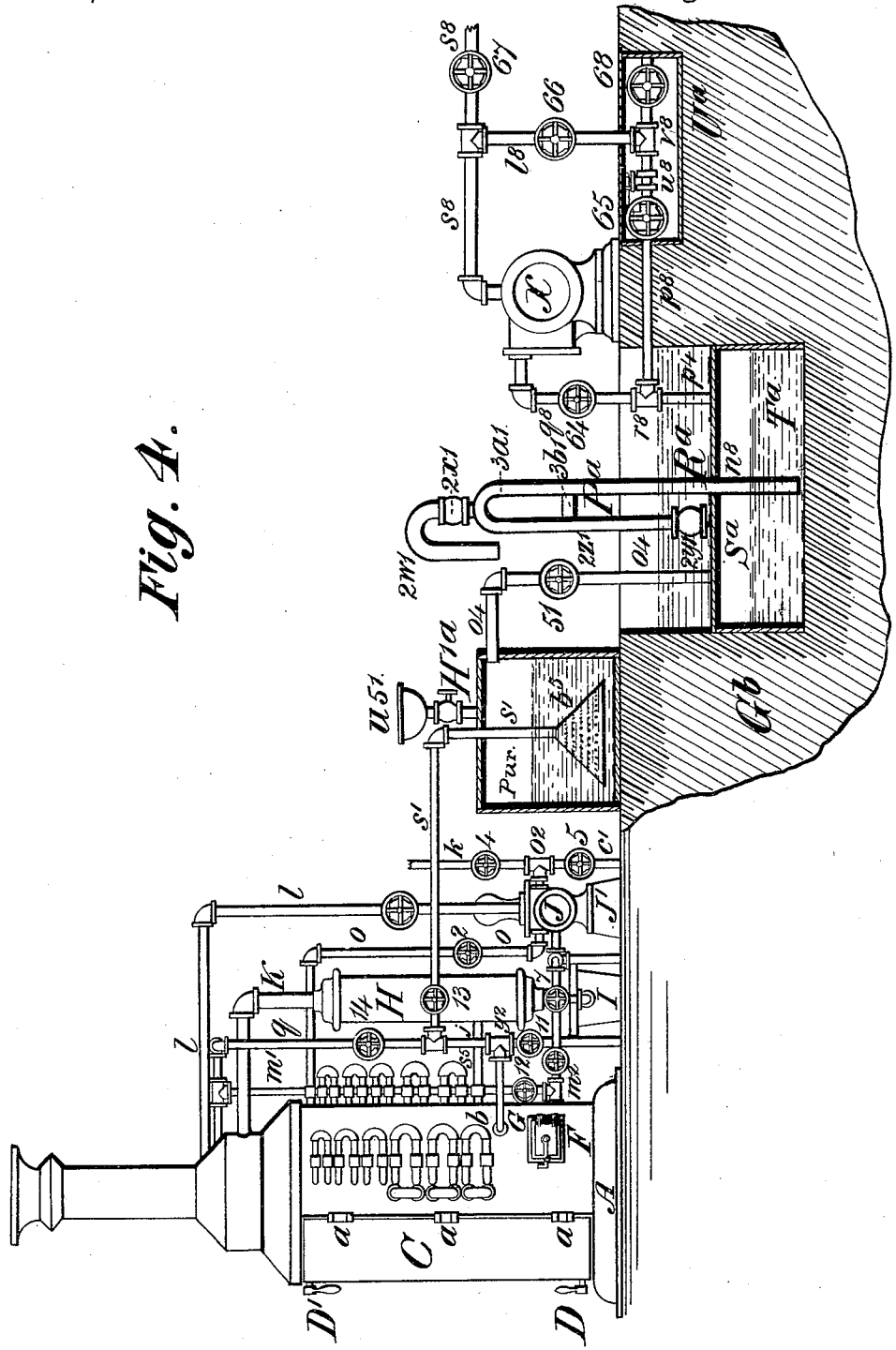
Figure 5:
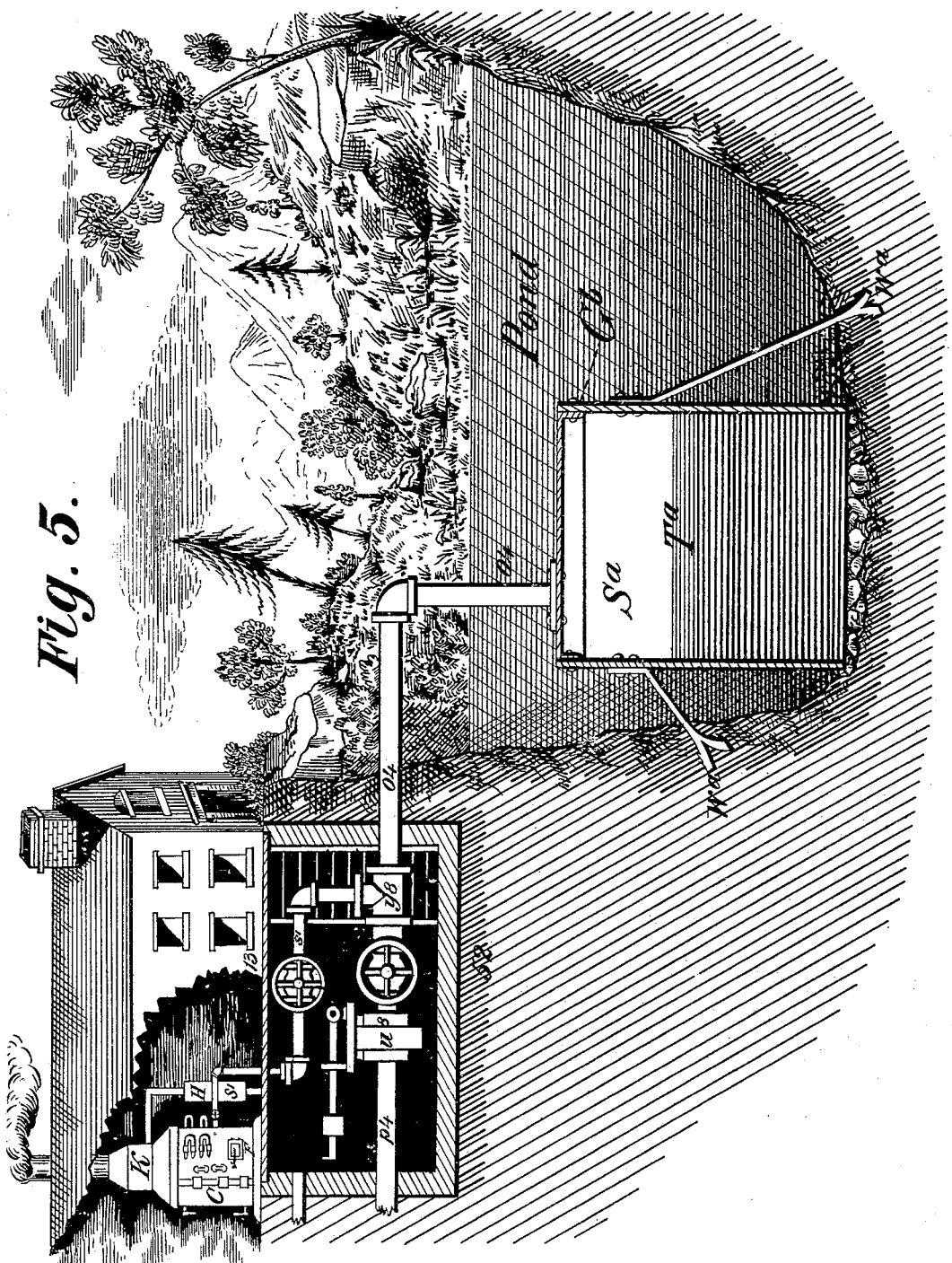
Figure 6:
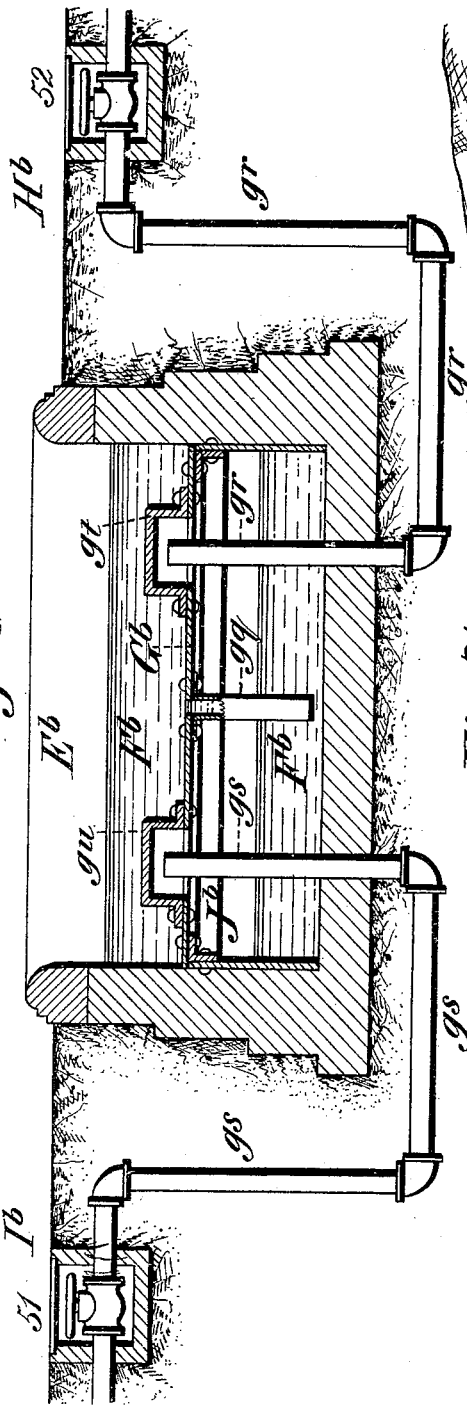
Figure 7:
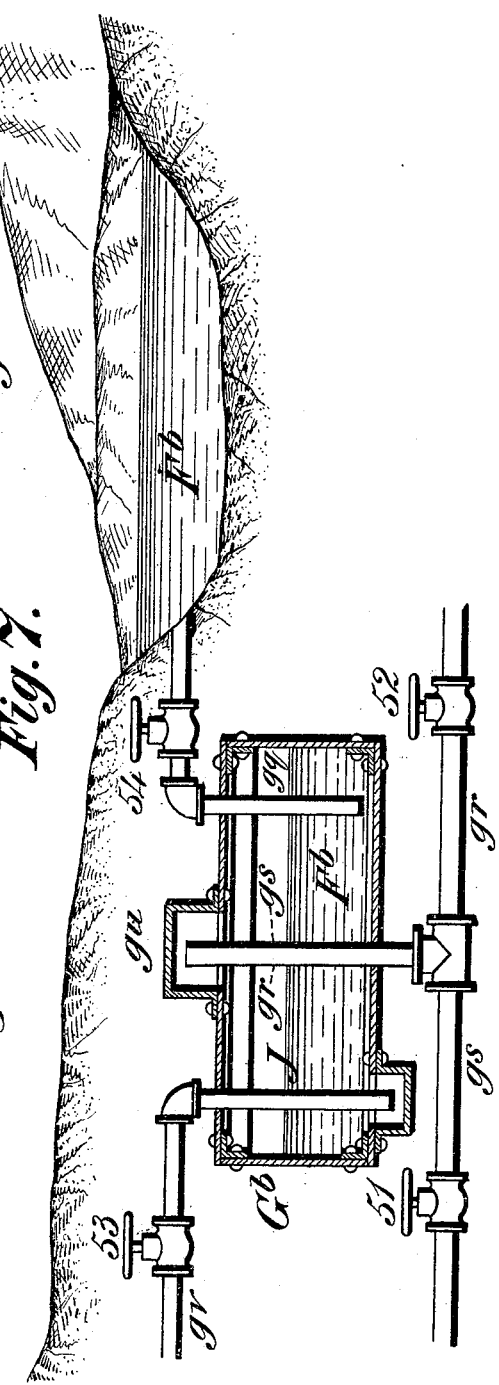

Figure 1 is a side elevation of a gas-generating apparatus with a pump for forcing combustible liquids and water into said generator, and also a vertical sectional elevation of a tank or reservoir for holding combustible liquids, which are forced into the said generator by means of compressed air. Fig. 2 is a side elevation of a gas-generating apparatus which is provided with a pump and tank for holding combustible liquid, which is forced out of said tank, by means of steam-pressure, into an injector, from whence it is forced into a superheating-conduit, wherein a fixed gas is obtained. Fig. 3 is a side elevation of a gas-generating apparatus, and central sectional view of a tank or reservoir for holding combustible liquid, which is forced into a superheating coil or conduit or conduits by steam-pressure, a purifier into which the gas is forced, and a gas-holder. Fig. 4 is an elevation of a gas-generating apparatus, with a pump for forcing water and combustible liquids therein, a central vertical section of a purifier and gas-holder, and also the end view of a motor which is driven by the power of highly-compressed gas. Fig. 5 is a sectional view, showing a pond of water with an anchored gas-holder therein, and a building upon the bank or bluff surrounding said pond, broken away for the purpose of showing a gas-generating apparatus. Fig. 6 is a vertical sectional view of a gas-holder with induction and eduction gas-pipes thereto, and the means for forcing gas from said holder by the displacement of water. Fig. 7 is a sectional view of a gas-holder, showing pipe-connections for the admission of gas and water, the gas being forced from the holder by water-pressure. Fig. 8 is a view of a high-pressure-gas generator, gas-motor, steam-boiler, and engine.

In Fig. 1 a high-pressure-gas generator is shown in side elevation, and a sectional view of a tank or reservoir for holding combustible liquids which are forced into the generator by means of compressed air, which is compressed in the tank U' by the air-pump $j^3$.

$k^3$ is the handle for working the piston, and $l^3$ is a connection between the air pump and tank for conducting the air into said tank or into a conduit, $m^3$, formed on the inside of the tank, for the purpose of conducting the air and discharging it into the tank above the surface of the liquid E. The pressure in the tank will be indicated by the gage $h^3$. The tank is supplied with liquid through the filling-cup $u^5$, the amount of which will be determined by the glass gage $i^3$. This liquid is forced by the atmospheric pressure through pipe $f^3$ into T-fitting $d^3$, where it unites with water which is discharged from pipe $o$, and is forced from thence through pipe $e^3$ into the upper conduit within the generator, and thence downward through the series of conduits, from whence it is discharged in the form of vapor or gas into the separator or receiving-chamber H, and from thence into the dome or other suitable place, from which it is conducted through pipe $m'$ and discharged into the superheater, wherein a fixed gas is formed and conducted to places of use.

The atmospheric pressure in the tank U' should exceed the pressure in the gas-generator by several pounds, in consequence of the diminishing pressure in the tank, which will correspond to the amount of liquid combustibles discharged therefrom. The pressure in the conducting-pipe can be made uniform or equal to the pressure in the generator, which is determined by the safety-valve L, by means of the equalizing-valve $g^3$; but when the pressure in the tank U' has been reduced to the pressure in the generator more air will have to be forced into the tank in order to force the combustible liquid through the equalizing-valve. The pressure within the tank can be kept constantly above the pressure in the generator by means of an air-pump driven constantly by mechanical power, or a constant or equal pressure can be maintained by the introduction of gas in lieu of air, said gas being forced therein by means of a pipe connecting the tank with the dome or a branch pipe connecting with the discharge-pipe $s'$. The combustible liquid can also be forced directly into the superheater through pipe $2^{r\prime}$ and fitting $y^2$. The flow will be controlled by valves 84 and 85.

When powdered gas-producing material is to be utilized and forced into the generator in combination with water or other liquids, it can be done by connecting a pipe, $l^o$, with the induction-pipe $c'$ to the pump. The top of the pipe $l^o$ can be provided with a suitable receptacle, $k^o$, for receiving the powdered material, which can be discharged therein by means of a spout, $m^o$, or some other suitable contrivance. The pipe or conduit $l^o$ must be kept quite full of the material to prevent the ingress of air, which, if admitted, would stop the induction of water to the pump. The end of the pipe or nipple terminating in the fitting $o^2$ can extend beyond the outlet of the induction-pipe $c'$ and into or near to the nipple, thus producing an exhaust or suction in pipe $l^o$ which will facilitate the induction of the powdered material and prevent the tendency to pack in the pipe $l^o$. Combustible liquid can be mixed or combined with the powdered material while descending in pipe $l^o$ simply by connecting the induction-pipe $k$ with the pipe $l^o$ by means of nipples or pipe $2^{u\prime}$ and controlling-valve 86. By closing valve 4 on pipe $k$ and opening valve 86 the combustible liquid will mingle with the powdered material and be drawn into the pump with the water and forced therefrom into and through the generator, where it will be evolved to gas for motive power, heating, and illuminating purposes. In case the gas from powdered material should be used, after being converted to gas in the high-pressure-gas generator, as a motive power, it will be necessary at first to make a fixed gas therefrom, thereby converting all of the hydrocarbonaceous solid matter into a gaseous form, and thence force it through a washing apparatus, wherein the ash or earthy matter will be separated therefrom, thus preventing the wearing or cutting away of the frictional parts of the motor. The liquid and powdered combustibles can be at first mixed together, and then put into the tank U' and forced therefrom by atmospheric or gaseous pressure, in the manner as above described in forcing the liquid combustibles from the tank to the generator.

The foregoing-described features are of importance when taken in connection with a high-pressure-gas-generating apparatus, and also the device for carbureting steam or water-gas and the products of combustion (shown in Fig. 2) are important. The tank U' is partly filled with combustible liquid E, leaving a space, $Q^3$, for gaseous vapor. The steam-pipe $s^6$, leading from the dome, conducts gaseous vapor or steam into the tank U'. The steam is controlled by valve 87. On opening this valve the steam or gas is forced down into the conical termination on the lower end of the pipe and sprayed out therefrom into the surrounding combustible liquid, whereby it becomes carbureted, and is discharged therefrom through pipe $2^{s\prime}$ and controlling-valve 43 into injector R', where, by the force from the generator, the gas from the tank U' will draw and force the products of combustion from the pipe Q into $2^{t\prime}$ and thence into the superheater O, from whence it is discharged into purifiers and from thence into suitable places of use, as hereinbefore specified. The tank U' must be strong enough to sustain the pressure within the generator. The remaining parts of the apparatus shown in Fig. 2, and not described, are similar in construction and operation to the generator hereinbefore shown and described.

In Fig. 3 a tank, U', is shown charged with liquid combustibles, which is volatilized in said tank by means of steam, gas, or vapor, and the products of combustion which are forced and inducted therein by steam-pipe $g^3$, pipe Q, and injector R'. Valves 29 and 30 are for controlling the steam and the products of combustion. The tank U' is charged with liquid combustibles through the cup $u^5$. The steam or gas which is generated in the high-pressure generator is conducted through pipe $g^3$, and is discharged into the injector, through which it passes, and at the same time drawing and forcing the products of combustion from the stack S through pipe Q, and finally discharging the combined mixture into and through the inverted spray-funnel, where it comes in contact with the combustible liquid, and is thereby carbureted. The gaseous mixture is now forced through pipe $2^{v\prime}$ into the superheating-coil within the generator. The flow of the gaseous mixture is controlled by valve 88. Said mixture is now forced through the superheater and discharged therefrom either through pipe S' or through pipe $W^8$ into the purifier $H^{1a}$, where it becomes purified, and discharged therefrom and conducted by pipe $o^4$, provided with controlling-valve 51, into a gas-holder, from whence it is conducted by gas-main $p^4$ to places for use, the flow being controlled by valve or equalizing-valve 52, which is surrounded by a box, $g^r$. Pipe $c^4$ is for conducting gas from the holder $G^b$ to the hollow perforated grate $d^4$. The flow in pipe $c^4$ is controlled by valve 32. The gas-holder $G^b$ is sunk into a pit or shaft, $P^a$, which is made in any suitable manner. The holder $G^b$ should be somewhat less than one-half of the depth of the shaft, and when there is no gas therein the holder should be filled with water, and also a few inches of water should be on the top of said holder for the purpose of affording sufficient pressure to expel all of the gas from the holder when necessary. While the gas is being forced through pipe $o^4$ into the holder in space $S^a$ the water is being discharged from the holder through pipe $n^8$. Consequently the displacement of water $T^a$ in the holder is transferred to the top of the holder, the weight of which counterbalances the pressure of gas in said holder, and also the pressure will be equalized while the gas is being forced from said holder. A tube provided with a float can project through the top of the head and extend to the bottom of the holder for the purpose of indicating the amount of water or gas in the holder. The top of the shaft should be covered over during cold weather, and if left open during warm weather a fence should be made around the circumference. Gas or steam to drive the pump is conducted thereto through pipe $l$, while the water is forced by the pump to the generator through pipe $o$. The pipe $2^{u\prime}$ is for conducting off the condensation from the separator H.

In Fig. 4 a high-pressure-gas generator is represented with a purifier, $H^{1a}$, which is charged with purifying material through the cup $u^{51}$. The gas which is generated in the generator is forced therefrom through pipe $s'$ into said purifier, and from thence through pipe $o^4$ and controlling-valve 51 into a submerged gas-holder, $G^b$.

$R^a$ represents the top of the holder; $S^a$ and $T^a$, gas and water in said holder. This water is forced by the pressure of the gas which is being generated in the high-pressure-gas generator from the gas-holder $G^b$ up through the long leg $n^8$ of the siphon $3^{a\prime}$ through the check-valve $2^{x\prime}$ and small siphon $2^{w\prime}$, from whence it falls into the shaft or reservoir $P^a$ while the holder is being filled with gas, after which the water will remain at rest and keep the gas in the holder under a pressure due to the height of the column of water in the long leg of the siphon; but when the pressure is removed by discharging the gas from the holder the column of water in the long leg $n^8$ will fall, and also the check-valve $2^{x\prime}$ will close and prevent the admission of air into the siphon $3^{a\prime}$, thus tending to form a vacuum in the upper part of the siphon, which will be filled by opening the check-valve $2^{y\prime}$ in the short leg $2^{z\prime}$ projecting from the reservoir $P^a$ until the gas is all discharged and the water transferred to the holder.

By the above-described process a constant pressure on the gas-holder can be maintained while the generator is at work. Said pressure will be due to the height of the vertical column in the long leg of the siphon $n^8$. If this height should be one hundred feet, there would be a pressure of about forty-seven pounds per square inch exerted on the gas, which will be constant while the generator is at work. With this pressure an engine, X, can be driven. The gas can be conducted through pipe $p^4$, T-fitting $r^8$, controlling-valve 64, and pipe $q^8$, the exhaust being through pipe $s^8$ into a furnace or other places of use; or by closing valve 67 the exhaust can be through pipe $l^8$, valve 66, and T-fitting $v^8$ into the street-main $h^8$, where the back-pressure will be so slight that the movement of the engine will not be materially affected thereby. An equalizing-valve, $u^8$, is employed on the main pipe $p^8$ for the purpose of maintaining an equal pressure at all times in the street-mains and service-pipes.

Whenever the siphon $3^{a\prime}$ is above the height of thirty-two feet a cross connecting-pipe, $3^{b\prime}$, should connect the two legs $n^8$ and $2^{z\prime}$ at about thirty feet from the lower end of the long leg, whereby when the generator is not at work the pressure on the holder will be immediately reduced from one hundred to about thirty feet, or from forty-seven to fifteen pounds, which will constantly decrease until the gas in the holder is displaced by the water above the holder, said water being transferred by the siphon. The short leg of the said siphon need not project above the connecting-pipe $3^{b\prime}$; but the check-valve $2^{x\prime}$, or an equivalent thereof, must remain at or near the discharge end of the long leg $n^8$. The valves 65 and 68 are for controlling the flow of gas in the main pipe $p^8$. The valves are surrounded by a box, U$^a$, and cover thereon, so that they may be easy of access at all times. The construction and operation of the high-pressure-gas generator is the same as shown in the preceding figures.

In Fig. 5 a high-pressure-gas generator is shown in a building. This generating apparatus is like those shown in preceding figures. The gas-holder G$^b$ is in communication with the generator and without the interposition of a purifier, as shown in Figs. 2, 3, and 4. The gas is forced through pipe s$'$ into fitting y$^8$ and pipe o$^4$, from whence it is discharged into the gas-holder. Pipe o$^4$ is a part of the street-main, and does the double duty of supplying the gas holder with gas and conducting said gas to the continued main pipe p$^4$, which is provided with a valve, 52, and equalizing-valve u$^8$, which answers the purpose above described in Fig. 4.

The important feature shown in Fig. 5 is in submerging the gas holder in a pond of water, river, or sump, where it is firmly anchored. This holder is without a bottom, and rests upon a foundation which will admit of a free ingress and egress of water, so that when gas is forced into the top thereof an amount of water due to the pressure of the gas will be displaced. All deposition of gas-tar will be carried away at the bottom of the holder by the surrounding water. An important advantage is that the gas-holder can be made of light material, for the reason that the pressure on the holder is equal at all times, whether full of gas or water. To insure an equal pressure the holder should be submerged in twice its depth of water. Where the water is shallow the area of the holder can be made to suit the depth of water and the quantity of gas required. Only one pipe is shown for the induction and eduction of gas in connection with the gas-holder; but two pipes can be employed, one of which can project nearly to the bottom edge of the holder and discharge the gas therefrom into the water within the holder, where it will it become purified thereby on its ascent through the water; and also be necessary purifying apparatus can be interposed between the generator and submerged gas-holder.

In Fig. 6 a gas-holder, G$^b$, is represented as being built inside of a reservoir, E$^b$. This reservoir can be built of any suitable material, and with an inverted cup or gas-holder, G$^b$, secured therein in such a manner that it cannot rise or float out of its position. It is not necessary that the holder should be in the form of a cylinder or provided with side or sides, as shown in the figure, for a division-plate, which now answers for the top of the holder, can be built into the side of the reservoir, while the center of the plate can be anchored to and supported by the bottom of the reservoir in a suitable manner by stay-bolts; or said plate can be secured and supported in any other suitable manner that can or may suggest itself to a mechanic or mechanical engineer. The holder is provided with two domes, g$^u$ and g$^t$, which project just above the water F$^b$ that covers the top of the holder when the gas is all discharged, thus preventing any water from entering the induction and eduction gas-pipes g$^s$ and g$^r$, which project above the low-water line in the reservoir. This low-water line should be from six to ten inches above the division-plate J$^b$, so as to afford sufficient pressure to force all of the gas through the main. It is not necessary that the pipes g$^r$ and g$^s$ should project up through the bottom of the reservoir E$^b$, for they can project down and be connected to the top of the domes g$^u$ and g$^t$, and serve their purpose as well as in the position shown. As the pressure in the gas-holder is variable, an equalizing-valve, u$^8$, (shown in Fig. 5,) should be employed in connection with the eduction-pipe g$^r$, and also it should be placed outside of the controlling-valve 52, as shown in Fig. 5; and, furthermore, but one pipe for induction and eduction can be used in connection with the holder, the same as shown at o$^4$ in the aforementioned figure. The reservoir E$^b$ is an artificial substitute for the natural pond of water shown in Fig. 5. In country towns or places contiguous to ponds or water-courses of sufficient depth of water the gas-holder can be located therein and answer the purpose of the present gas-holders now in use. Where the water is not of sufficient depth in said pond or water-courses the bottom thereof can be dredged until such depth is obtained, and also sumps can be formed in the course of a running brook of water, the induction therein and eduction therefrom being filled and discharged by said brook or stream of water. The holder can be located in said sump and made to do the duty required of the natural pond or artificial reservoir, and, further, the gas-holder can be submerged in lakes and harbors and serve the purpose of the above-mentioned ponds, sumps, and artificial reservoirs.

The operation of the gas-holder shown in Fig. 6 is as follows: The gas is at first generated in the high-pressure-gas generator, from which it is forced through the induction-pipe g$^s$, from whence it is discharged into the dome g$^u$, from thence upon the surface of the water F$^b$ within the holder. The pressure of the accumulating gas forces the water from the holder up through the pipe g$^q$, where it rests upon the plate J$^b$ on top of the gas-holder, thus equalizing the pressure upon both sides of said plate J$^b$. While the gas is being discharged from the holder the water will return through said pipe g$^q$ and fill the place occupied by the displaced gas. Thus, by the arrangement above described, the gas will remain at all times under a varying pressure, the minimum of which should correspond nearly to the pressure of the gas in the eduction-pipe leading from the equalizing-valve.

Valve 51 in the box I$^b$ is the controlling-valve for controlling the flow of gas between the high-pressure-gas generator and the gas-holder. Valve 52 in box H$^b$ controls the outflow of gas from the gas-holder.

A gas-holder, $G^b$, is shown in Fig. 7 as being buried in the earth and partially filled with water $F^b$, which is conducted from the water $F^b$ in a pond or other source from which water can be obtained by pipe $g^q$ and controlling-valve 54. The gas is inducted through pipe $g^s$ and valve 51 and pipe $g^s$ $g^r$, from whence it is discharged into the dome $g^u$ and thence upon the surface of the water, which is now forced out by the accumulating gas from the high-pressure-gas generator through pipe $g^q$ into the pond or an equivalent thereof. This pond can be a long distance from the gas-holder and connected with the holder by a suitable conduit or pipe, which may run over hills and siphon the water from said pond into said gas-holder; but in all cases the source from whence the water comes should be a suitable height above the gas-holder, in order to force the gas from said holder. The exit of the gas will be through pipe $g^r$, $g^s$, and $g^r$, controlling-valve 52, and an equalizing-valve. (Shown in Fig. 23.)

A reservoir equal in capacity to the gas-holder can be located at any convenient distance from the gas-holder and connected thereto by a suitable connection, and furnish water to operate or force the gas from the holder, and also to receive the water when forced from the holder by the gas. The gas-holder need not necessarily be buried in the earth, for one of sufficient capacity can be built on the surface and strong enough to withstand the pressure derived from the tank when said tank is filled with water.

In the drawings, Fig. 8, a high-pressure gas or gaseous-vapor generator is shown. The gas or gaseous vapor is conducted through pipe $S'$ to an engine, X. Valve 13 controls the induction of gas to the engine. The exhaust from the said engine X is conducted to the furnace of a steam-generator, $X^3$, wherein the gas is burned, the heat of which generates steam in the boiler. This steam is conducted by pipe $y^3$ to a steam-engine, $Z^3$. Valve 72 is for controlling the induction of the steam to the engine. The exhaust-steam from the engine $Z^3$ can be exhausted into a carbureting-tank, where it will become carbureted. From thence it can be discharged into a furnace and burned, or it can be discharged into a suitable heating device, wherein the gaseous vapor can be converted to a fixed gas. From thence it can be discharged into a gas-holder, and be subsequently used for heating and illuminating purposes. The steam which is exhausted from engine $Z^3$, after being carbureted as mentioned above, can be conducted to the furnace of a steam-boiler, similar to boiler $X^3$, wherein said carbureted steam or gaseous vapor will be burned and generate steam to drive another engine with, the exhaust-steam of which can be carbureted and conducted to still another boiler-furnace, wherein it will be utilized to generate steam for the purpose of driving another engine. This mode of increasing power can be continued to any extent desired, and, further, the carbureted exhaust from the last engine can be conducted to the furnace of the first boiler, whereby a continued transmission of heat is effected throughout the chain of boilers and engines. When large power is required several engines can be so arranged that the exhaust of each can be discharged into a carbureting-tank, wherein the steam will become carbureted and forced therefrom to a boiler-furnace or several boiler-furnaces, wherein the carbureted steam or gaseous vapor will be burned and the heat derived therefrom utilized to generate steam to run the engine with.

I reserve to myself the right to claim in future application or applications for Letters Patent all of the patentable matter which cannot be claimed in this application.

What I claim, and desire to secure by Letters Patent, is—

1. The process of generating gas which consists in forcing powdered carbonaceous material and water together into and through heated conduits.

2. The process of generating gas which consists in forcing together powdered fuel, carbonaceous material, liquid hydrocarbon, and water into and through heated conduits.

3. The process of generating gas which consists in forcing steam or gaseous vapor under pressure through a hydrocarbon liquid, then mixing the carbureted steam or vapor with the products of combustion from a furnace, and then forcing the resulting mixture into and through generating and fixing conduits.

4. In combination with the generating apparatus, a connected pump, a water-pipe, a pipe for carbonaceous material, and an oil-supply pipe.

5. The oil-supply pipe and the pipe for supplying powdered carbonaceous material, connected with each other, in combination with the pump, the generating-coils, and suitable connections, for the purpose described.

6. The carburetor and a steam-pipe opening therein, a pipe connected with the stack for conveying products of combustion, and connected with the carburetor by an injecting device, in combination with the fixing-coils of the generator.

7. A fixed submerged high-pressure-gas holder provided with a body of water in its lower portion, connected by a suitable pipe with an equalizing-body of water above it for keeping the gas under pressure and forcing it into the mains, and said holder having induction and eduction gas-pipes, for the purpose described.

8. A fixed submerged high-pressure holder connected with a suitable water-supply above it, in combination with a high-pressure-gas generator and an equalizing and regulating valve.

WM. FRANK BROWNE.

Witnesses:
R. SYLVANI,
WM. APGAR.